United States Patent [19]
Blinne

[11] Patent Number: 5,995,730
[45] Date of Patent: Nov. 30, 1999

[54] METHOD FOR GENERATING FORMAT-INDEPENDENT ELECTRONIC CIRCUIT REPRESENTATIONS

[75] Inventor: Richard D. Blinne, Fort Collins, Colo.

[73] Assignee: LSI Logic Corporation, Milpitas, Calif.

[21] Appl. No.: 08/862,233

[22] Filed: May 23, 1997

[51] Int. Cl.[6] .................................................. G06F 17/50
[52] U.S. Cl. .............................. 395/500.04; 395/500.19
[58] Field of Search .................................. 364/488–491, 364/578; 395/500, 500.02, 500.19

[56] References Cited

U.S. PATENT DOCUMENTS

| | | | |
|---|---|---|---|
| 5,084,824 | 1/1992 | Lam et al. | 364/490 |
| 5,263,162 | 11/1993 | Lundeby | 395/700 |
| 5,278,769 | 1/1994 | Bair et al. | 364/490 |
| 5,384,710 | 1/1995 | Lam et al. | 364/489 |
| 5,423,023 | 6/1995 | Batch et al. | 395/500 |
| 5,452,226 | 9/1995 | Hooper et al. | 364/489 |
| 5,452,227 | 9/1995 | Kelsey et al. | 364/489 |
| 5,463,563 | 10/1995 | Bair et al. | 364/490 |
| 5,625,567 | 4/1997 | Mankin et al. | 364/490 |
| 5,805,861 | 9/1998 | Gilbert et al. | 395/500 |

FOREIGN PATENT DOCUMENTS 4408106  12/1994  Germany  .......................... G06F 15/60

OTHER PUBLICATIONS

Verilog Netlist as an Exchange Language; Jen–Jen Lung and J. Bhasker; Jul., 1994 IEEE; pp. 10–14.
A Unified Data Exchange Environment Based on EDIF; Wanhao Li et al.; Proceedings of the Design Automation Conference; Las Vegas, Jun. 25–29, 1989; pp. 803–806.
Different Levels of Information Models for Use in Frameworks; Electronic Design Automation Frameworks, 1992, pp. 21–40, XP002078569.
PTO 99–1295 (Translation of German Patent Application, Document No. DE 4408106, Published Dec. 15, 1994, Invented by Lange, E., Translated by FLS, Inc., Feb. 1999).
Sugihara et al. ("Formal specification of data formats for user–friendly interfaces", IEEE Comput. Soc. Press, 1984 IEEE Workshop on Languages for Automation, pp. 209–214, Jan. 1, 1984).
Holierhoek et al. ("A Macro Block Comipler with logic optimization", CCVLSI–87 Technical Digest, Canadian Conference on Very Large Scale Integration, pp. 63–68, Jan. 1, 1987).

*Primary Examiner*—Kevin J. Teska
*Assistant Examiner*—Phallaka Kik

[57] ABSTRACT

Format-independent electronic circuit descriptions are generated by providing incompatible sets of naming conventions, providing translation rules for generating circuit element names which satisfy all supported naming conventions, and modifying element names in accordance with the translation rules. Supported circuit descriptions may represent netlists defined by high-level design languages such as Verilog, EDIF, VHDL, and so forth, or may represent schematics or other symbolic representations. Any element associated with any input circuit representation may be tested or modified to ensure compatibility, such as the naming of logic cell types and instances, the naming of nets interconnecting logic cells, and the naming of input, output, and bidirectional ports. In a preferred embodiment, an element name to be resolved is inserted into a set of element names to determine whether the name is unique. If not, the proposed name is modified according to a set of modification rules until uniqueness is achieved. The step of modifying a name may be carried out on an iterative basis, for example, by attaching an incremented or decremented index value to an element name as a prefix or suffix.

33 Claims, 6 Drawing Sheets

METHOD FOR GENERATING FORMAT-INDEPENDENT ELECTRONIC CIRCUIT REPRESENTATIONS

FIELD OF THE INVENTION

This invention relates generally to computer-aided-engineering (CAE) and, more particularly, to the automated translation of data for use by multiple automation tools presented with incompatible data formats.

BACKGROUND OF THE INVENTION

In the field of microelectronic circuit design, a particular circuit may be represented by a netlist, which is a data file or other data compilation specifying the descriptions and interconnections of the electrical elements in the circuit. Within a netlist, the electrical elements and their interconnections are labeled, or named, according to naming conventions particular to the specific format of the netlist.

Typical computer-aided-engineering (CAE) tools employed in the design of microelectronics circuits may use one or more specific netlist formats to enable the automated processing of the circuit during the design phases. Each specific netlist format, such as Verilog, EDIF, or VHDL, employs a particular naming convention which may be incompatible with another specific netlist format. As a result, it is generally not possible to use the name of an netlist element in one specific netlist format when translating that netlist into another specific netlist format.

The names in a netlist constrained by these naming conventions may include names of logic cell types, logic cells instances, input, output, and bidirectional ports, and interconnections (nets) among instances of logic cells. Although the naming conventions of these various netlist formats are known in the art, the need exists for a method of generating translations of names in specific netlist formats so as to realize format-independent names.

SUMMARY OF THE INVENTION

The present invention provides a method for generating a format-independent electronic circuit description by providing incompatible sets of naming conventions, providing translation rules for generating circuit element names which satisfy all supported naming conventions, and translating circuit element names from an input electronic circuit description in accordance with the translation rules. The electronic circuit descriptions may be in the form of netlists defined by high-level design languages such as Verilog, EDIF, VHDL, and so forth, or, alternatively, may represent schematics or other symbolic representations.

In translating the input electronic circuit descriptions to generate a format-independent representation, the invention may proceed by comparing an element name to be resolved with entries of a set of element names to determine whether the proposed element name is unique. If not, the proposed name is modified according to a set of modification rules until uniqueness is achieved. The step of modifying each name may be carried out on an iterative basis, for example, by attaching an incremented or decremented index value to an element name as a prefix or suffix.

Any element associated with any input circuit representation may be tested or modified to ensure compatibility, such as the naming of logic cell types and instances, the naming of nets interconnecting logic cells, and the naming of input, output, and bidirectional ports. In the event that both interconnection nets and ports are being translated, common net-port naming conventions may be used to maintain consistency. In addition, particularly with respect to port directions, a structural or functional translation may be used, as appropriate, in conjunction with a cell library.

DETAILED DESCRIPTION OF THE INVENTION

According to a broad aspect of the invention, format-independent electronic circuit descriptions are generated by applying translation rules to generate a modified circuit description in accordance with a format-independent naming convention. In describing important aspects of the system in further detail, a broad overview of the process architecture will first be presented, followed by details of the preferred naming translations.

Architectural Overview

Figure 1:
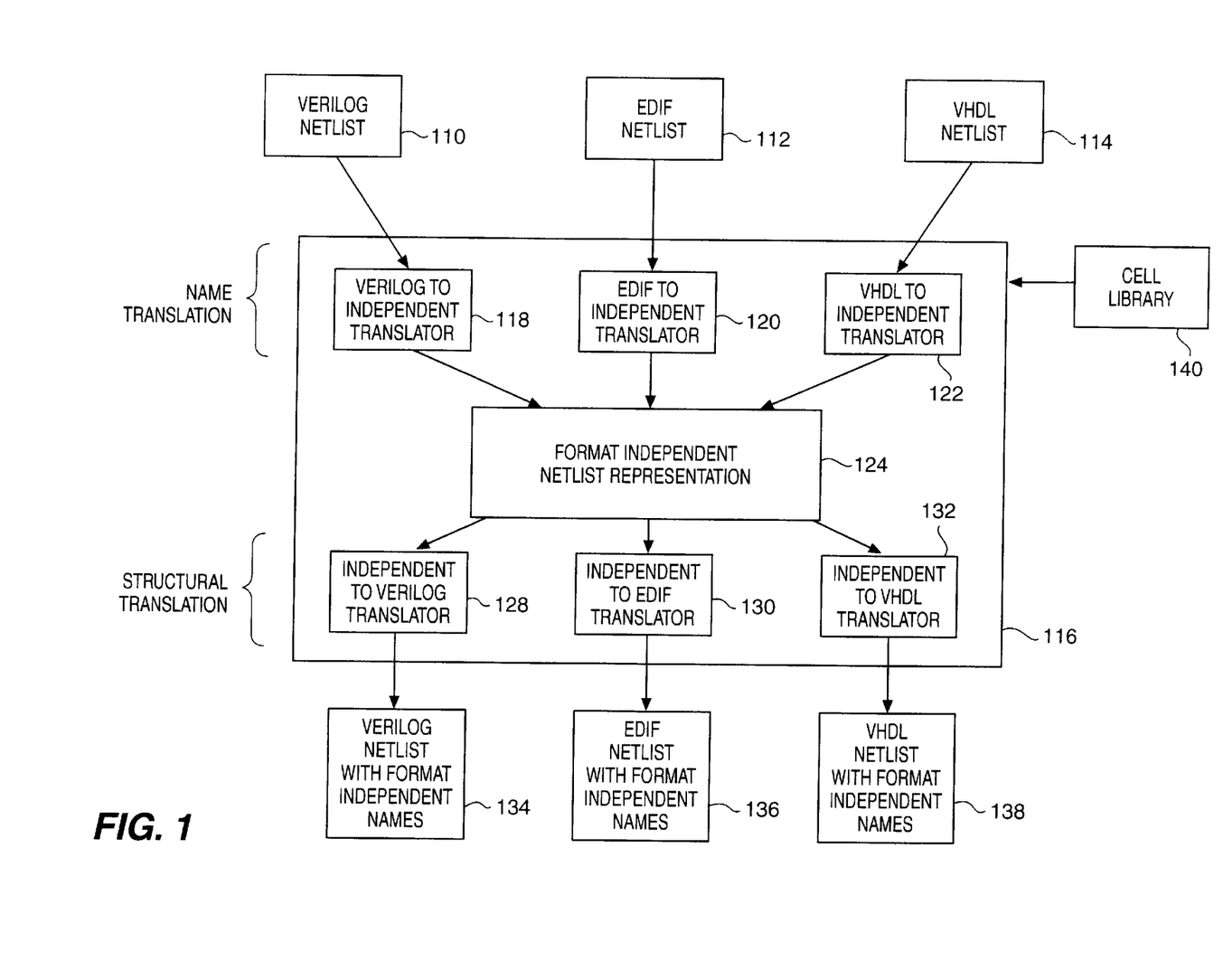
FIG. 1 is a block diagram which depicts an architectural overview of the invention within a computer-aided-engineering design flow.

FIG. 1 is an architectural diagram which depicts a translation method according to the invention within a CAE design flow. Blocks 110, 112 and 114 represent modules within the design flow which generate format-specific circuit representations. In particular, block 110 provides a Verilog netlist at its output, block 112 provides an EDIF netlist at its output, and block 114 provides a VHDL netlist at its output. Although the following discussion centers on the use of high-level design-language descriptions, other textual and/or symbolic representations, including schematic representations, may also be accommodated according to the invention.

The output of each module is provided as input to a translation block, shown generally at 116, wherein an appropriate submodule, 118, 120, or 122, translates the specific netlist format into a format-independent representation, depicted by block 124. The submodules 118, 120, and 122 preferably perform all name translations, generating format-independent names that satisfy the naming conventions of all supported specific netlist formats. The translation is accomplished through the application of specific translation rules. For example, all non-alphanumeric characters may be converted to underscores. These modifications may be stored in a database to allow translation to the original circuit representation.

As stated previously, the format-independent netlist representation preferably contains netlist element names that comply with the naming conventions of all of the supported specific netlist formats, these being Verilog, EDIF, and VHDL in this embodiment. In addition, other information needed to fully represent the circuit is maintained on a format-independent basis as well. For example, information needed to maintain consistency in the port directions of any signals which connect to multiple ports on a net is included in the format-independent netlist representation. Preferably, all other information needed to later generate a format-specific netlist also exists in the format-independent netlist.

In this embodiment of the invention, translations which produce case-insensitive collisions in netlist keywords and names are corrected to make the keywords and names unique. Such correction may be accomplished by adding an index as a prefix, suffix, or some other element to the collided keyword or name. If the keyword or name having the index still conflicts with another keyword or name, the index is incremented until the conflict is resolved. In this fashion, the invention converts each specific netlist element name into a format-independent netlist element name. These modifications may also be stored in a database to allows translation to the original form.

Blocks 128, 130 and 132 receive as input the format-independent netlist of block 124. The blocks 128, 130 and 132 may also receive as input a library of supported cells 140, which may contain structural or functional information. Preferably, the translations carried out in these three blocks are primarily structural in nature, without name translations; that is, each block is capable of producing a netlist with its associated specific netlist format, using the names from the format-independent netlist without modification. The structural modifications made to the original circuit description may be saved in a database. The format-specific netlists generated by these three blocks are depicted in blocks 134, 136, and 138. Each output netlist preferably shares a complete set of common names compatible with the naming conventions of each specific netlist format.

Further Detail As To The Naming Translations

Figure 2:
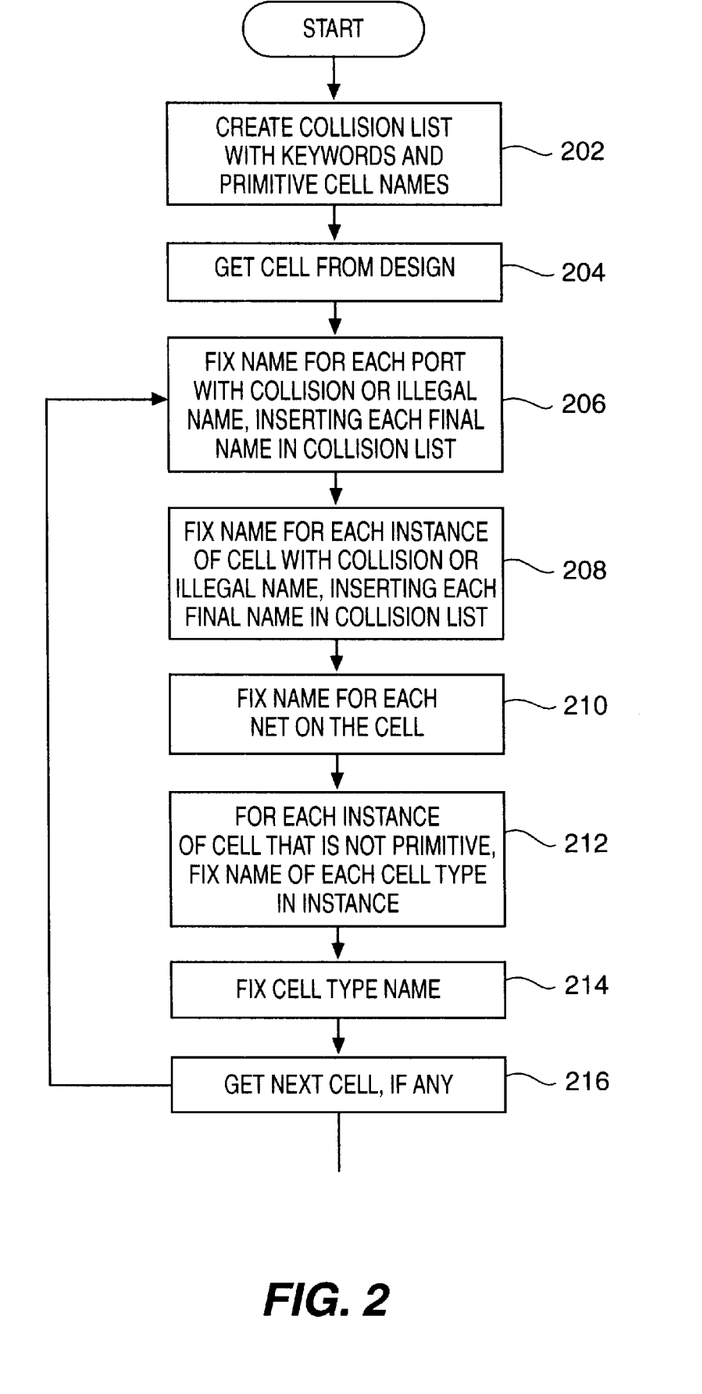
FIG. 2 depicts a primary routine associated with a general translation process.

FIG. 2 depicts a primary routine according to an embodiment of the invention Block 202 creates a collision list containing reserved keywords of supported netlist or schematic formats, and of cell-type names from the cell library. In block 204, a cell is selected from the design, and in blocks 206 through 216, this cell and each additional cell in the design is processed to fix port names, cell instance names, net names and cell type names, such that each name is consistent with the naming conventions of all supported netlist or schematic formats. Block 212, in particular, also processes each cell type name within a non-primitive instance in the design to assure that each cell type complies with supported naming conventions.

Figure 3:
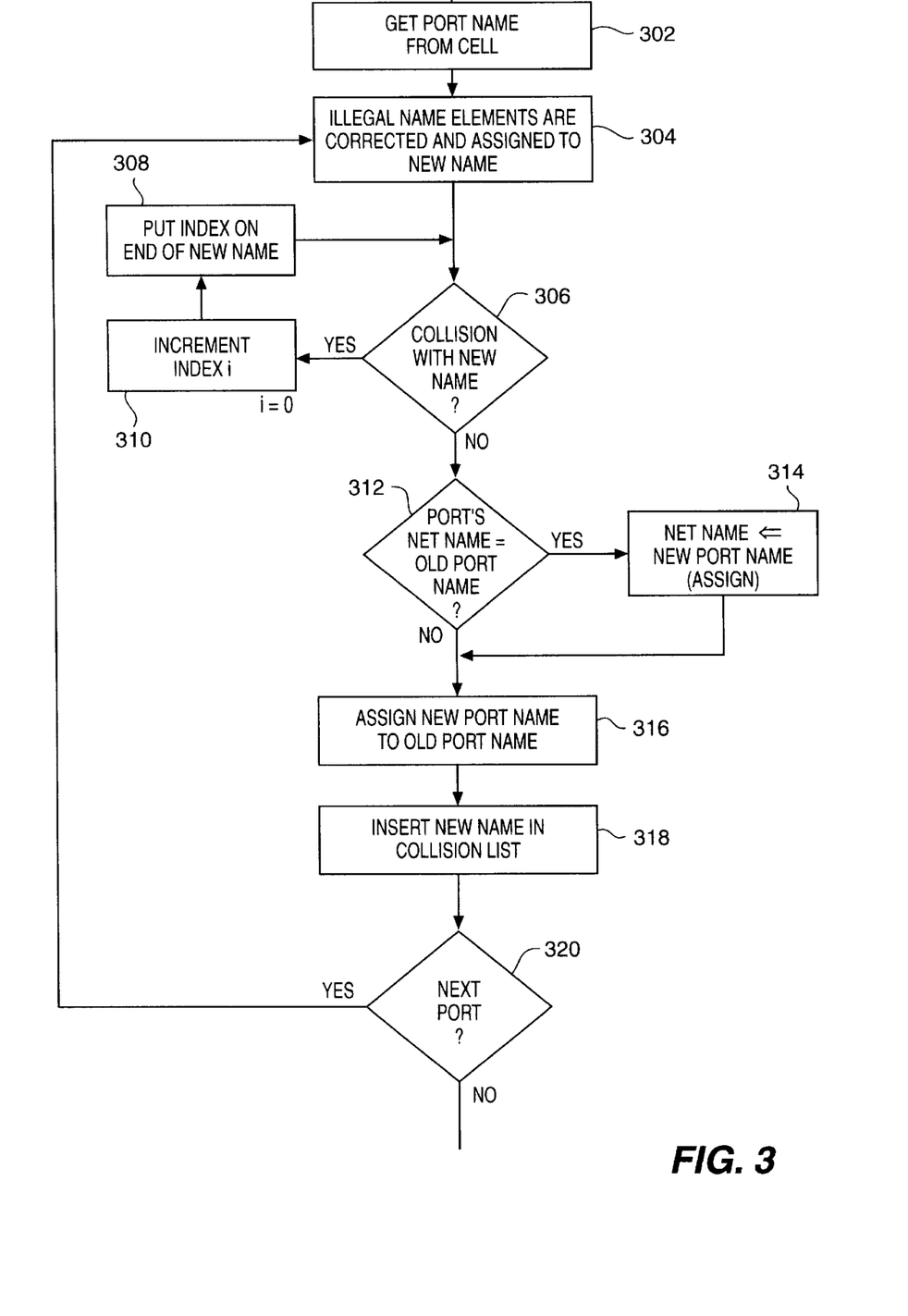
FIG. 3 is a flow diagram depicting particulars with respect to port name translation.

Important steps employed in block 206 are illustrated in FIG. 3. In block 302, a port name is selected from the selected cell. In block 304, illegal name elements are corrected, so as to satisfy the naming conventions of supported netlist or schematic formats. The corrected name is assigned to a new name variable. An index variable is set to 0. The new name is then compared to names in the collision list (in block 306), and if there is a collision, the index is incremented and concatenated onto the end of the new name in blocks 308 and 310. The program continues checking names in the collision list with the new name, now having the index suffix, incrementing the index suffix until contention is avoided. It should be pointed out that, although in a preferred embodiment, an index is incremented to provide a suffix, any technique capable of realizing uniqueness, whether or not by way of iteration, may alternatively be utilized, including decrementing an index, adding a prefix, or any other symbology around or within a name to be resolved.

Upon finding a new port name, with or without an index suffix, the program, at block 312, compares the old port name to the name of the net connected to the port. If the net name equals the old port name, then the new port name is assigned in block 314 to the net name to maintain consistency between the new port name and the attached net name. In block 316, the new port name is then assigned to the old port name variable, and in block 318, the new port name is inserted into the collision list. The program repeats these steps for all ports on the cell (block 320). When no additional ports are available, this portion of the procedure is exited.

Figure 4:
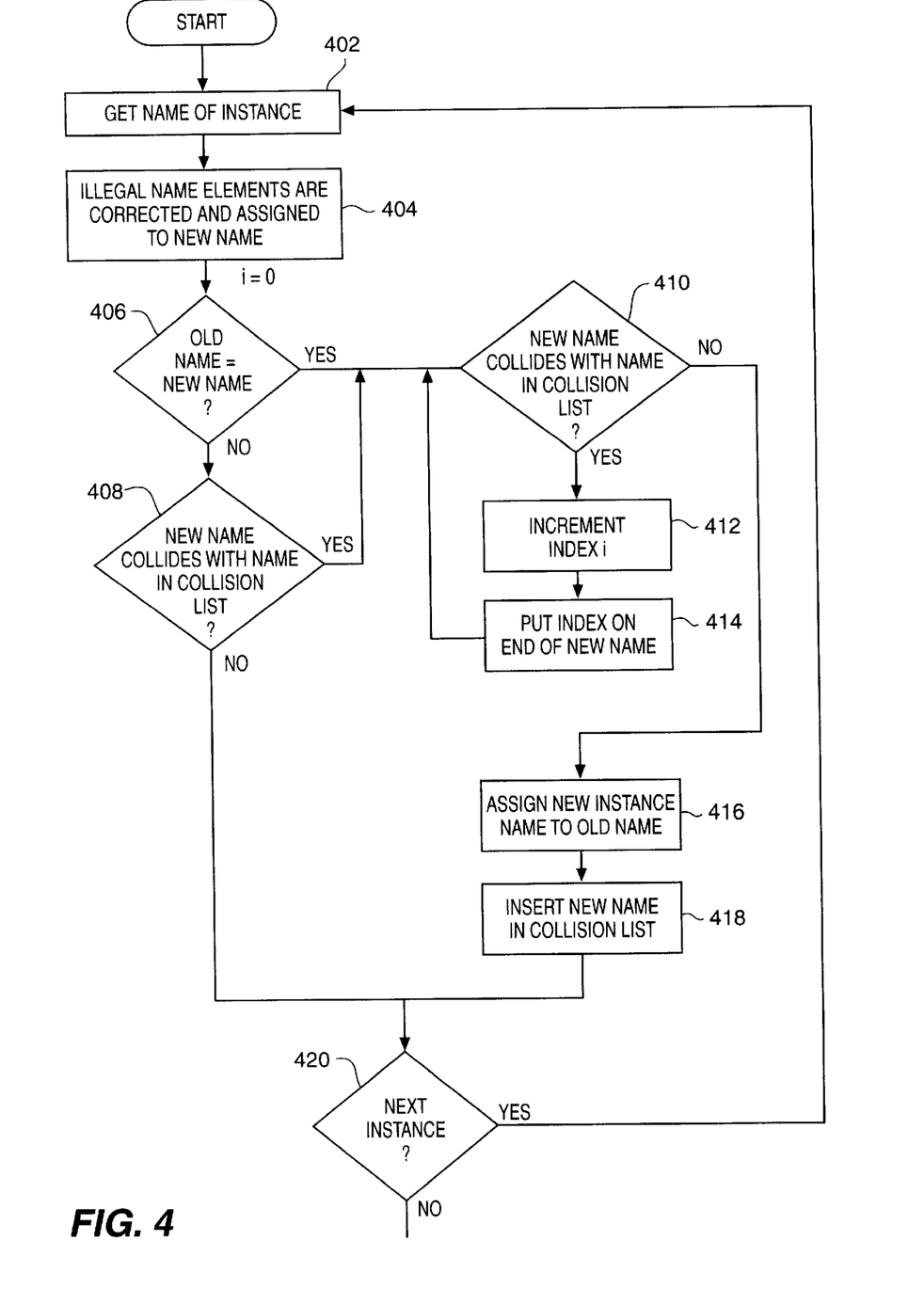
FIG. 4 is a flow diagram depicting particulars with respect to cell instance name translation.

A next step in the general translation process depicted in FIG. 2 is block 208, which fixes the name of each instance within the selected cell. Important steps employed within block 208 are illustrated in FIG. 4. At block 402, the program selects the name of a cell instance in the cell. In block 404, illegal name elements are corrected and assigned to a new name variable. An index is initialized to 0. In block 406 the program determines whether the corrected instance name equals the old instance name. If the two names are not equal, block 408 determines whether the new instance name collides with a name in the collision list.

If either of the conditions in block 406 or 408 are true, block 410 determines whether the new instance name collides with a name in collision list. If such a collision exists, the index is incremented in block 412 and affixed to the end of the new instance name in block 414. The program then loops back to block 410 for another test for name collision in collision list.

When the new name, with or without an index suffix, does not collide with a name in the collision list, the program assigns the new instance name to the old instance name variable in block 416 and inserts the new instance name in the collision list. The output of block 418 and the output of block 408, when the condition is negative, flow to block 420, which tests for the next cell instance in the selected cell. If there is a next cell instance within the selected cell, the program loops back to block 402 to correct the new instance name. Otherwise, the program exits the routine and continues to execute block 210 of FIG. 2, wherein the net names in the selected cell are translated.

Figure 5:
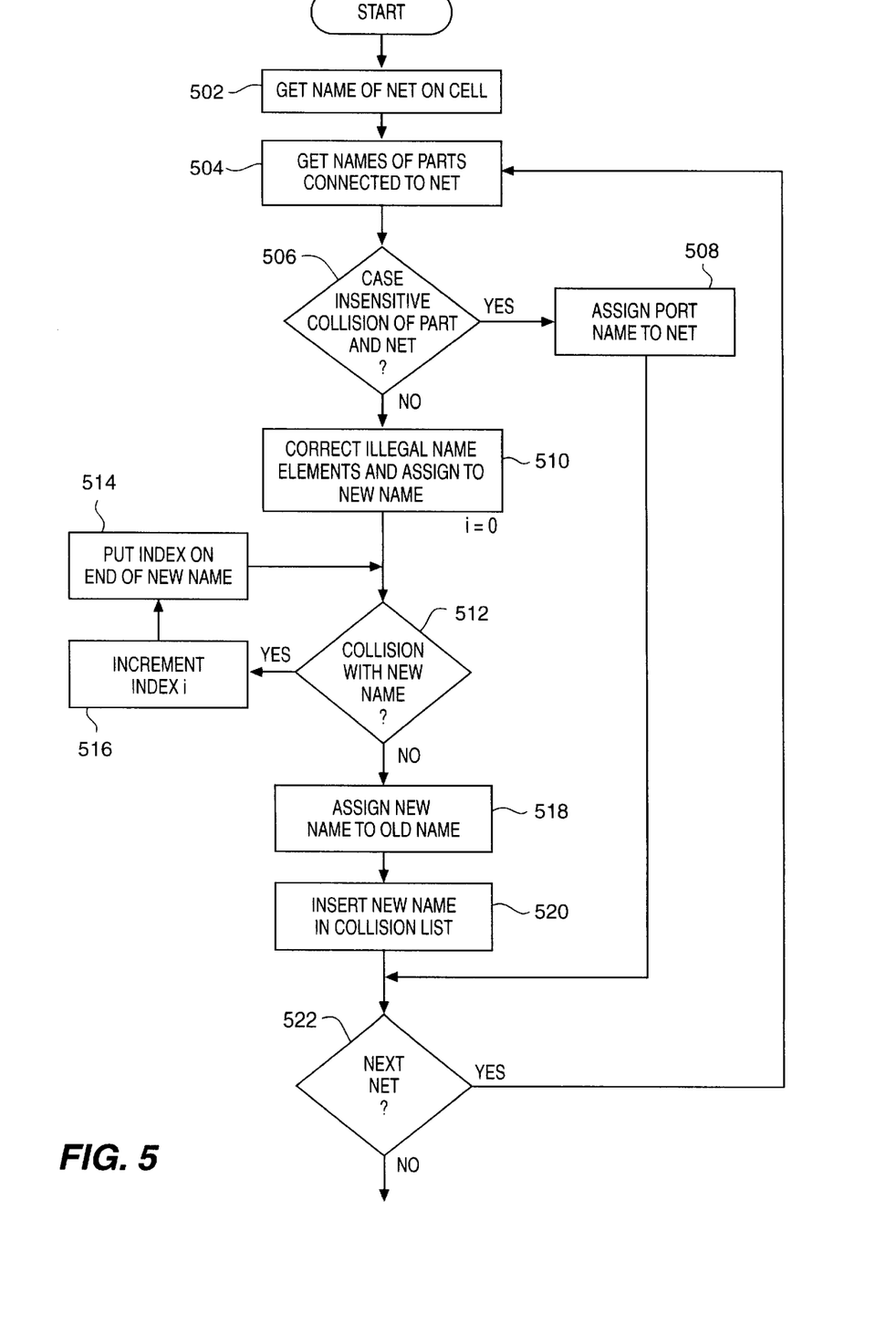
FIG. 5 is a flow diagram depicting particulars with respect to net name translation.

In block 210 of FIG. 2, the program translates net names to comply with the naming conventions of supported netlists. Important steps employed within block 210 are illustrated in FIG. 5. In block 502, the program selects the name of a net within the cell. In block 504, the names of ports connected to the net are selected, and in block 506, the program makes a non-case-sensitive comparison of the names of the ports and the name of the net. If a port is found to have a non-case-sensitive collision with the name of the net, then the net name is assigned to the port name, and the program moves to the next net of the cell in block 522. Otherwise, the program corrects any illegal name elements in the name of the net in block 510, and assigns the corrected name to a unique variable. An index is initialized to 0. Blocks 512, 514, and 516 correct any case insensitive collisions of the new net name with names in the collision list. In block 518, the new name is assigned to the old name, and in block 520, the new net name is inserted into the collision list. In block 522, the next net on the cell is selected and the program moves back to block 504 for further processing.

Figure 6:
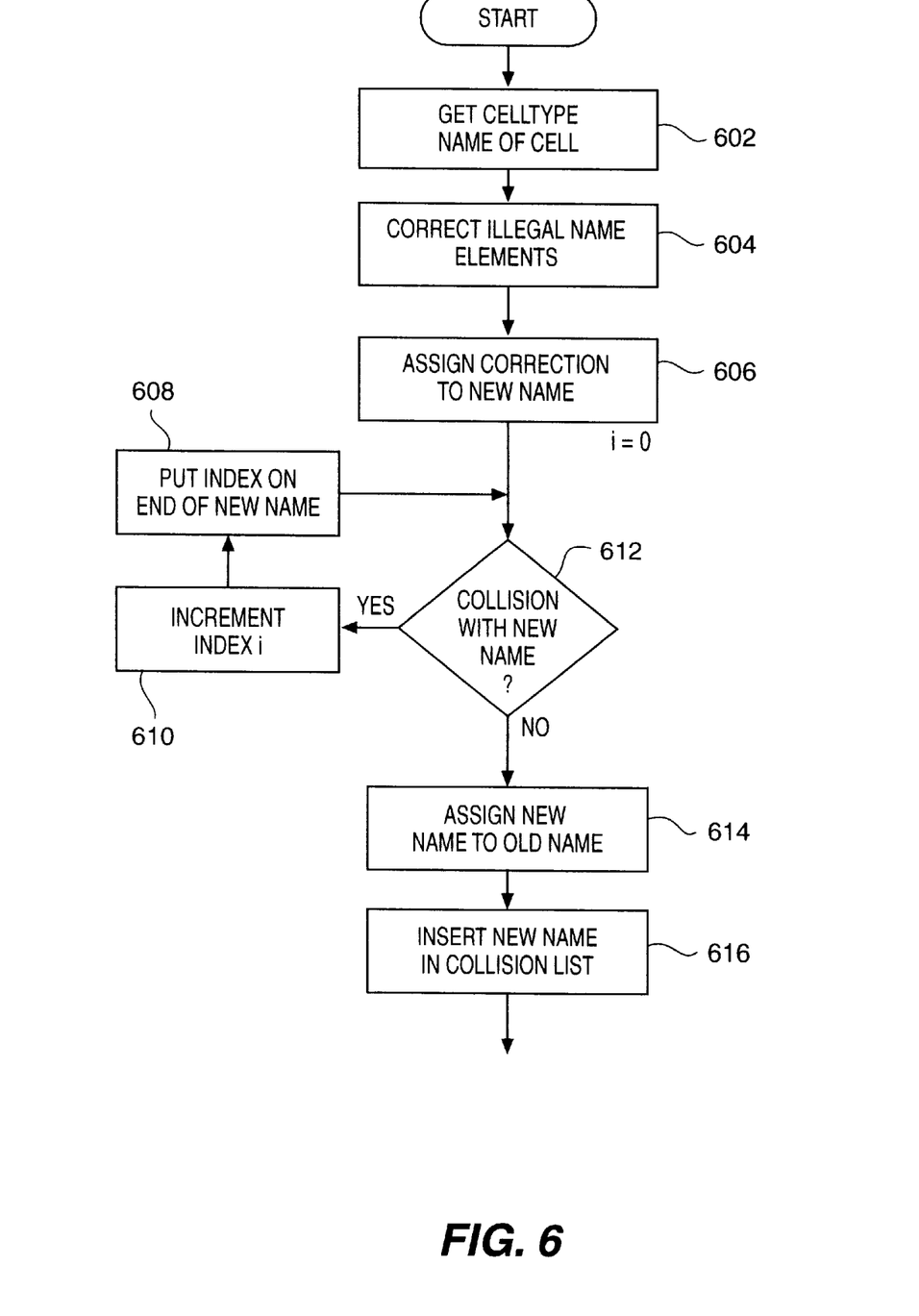
FIG. 6 is a flow diagram depicting particulars with respect to cell type name translation.

In block 212 of FIG. 2, the program translates names of cell types contained within a non-primitive cell. Certain of the steps executed within this block are similar to the detailed steps of block 214, which fixes the cell type name of the main cell being processed by the main routine. As such, the flowchart in FIG. 6 details certain of the steps associated with blocks 212 and 214. Block 602 selects the cell type names within the cell. In block 604, the program corrects illegal name elements, and in block 606, the program assigns the corrected name to a new name variable. An index is initialized to 0. Block 608 through 612 make the cell type name unique, alleviating collisions with names in the collision list. Block 614 assigns the new name to the old name variable, and block 616 inserts the new cell type name into the collision list.

The detailed steps of block 302, 404, 504 and 604, are commonly applied to correct translations of each name. If a name starts with a backslash (\) and ends with a space, the backslash and the space are removed. If the name contains a keyword from one of the supported netlist or schematic formats, the prefix "label_" is concatenated to the name. If the name does not contain keywords from a supported netlist or schematic format, then underscores, non-alphanumeric characters, digits, and other characters are processed sequentially through each name to comply with the naming conventions of supported netlists and schematic formats. If an underscore (_) or a non-alphanumeric character is the first or last character of a name, then it is removed. Substrings consisting of two underscores are reduced to one underscore. Non-alphanumeric characters immediately preceded by underscores are removed. Other non-alphanumeric characters are replaced with underscores. Furthermore, "label_" is inserted before "zero" characters (0) in a name.

In order to maintain compliance with VHDL port direction requirements, the preferred embodiment of the invention will maintain proper consistency of port directions on a multi-port net. This allows the format-independent netlist or schematic to comply with all supported specific netlists or schematic formats, including VHDL. As such, if there is more than one port on a net, the program preferably changes the name of the net to a unique name, rather than using the common net-port naming convention. Also, if the port on a net is an input port and any of the connected port instances are output ports or bidirectional ports, then the program preferably changes the net name to be unique. Likewise, if the port on a net is an output port and any of the connected port instances are input ports or bidirectional ports, then the program preferably changes the net name to be unique.

As such, an embodiment of the invention changes the names of cell types, cell instances, ports, and nets to a format-independent name by removing, replacing, or supplementing characters so that the name satisfies the naming conventions or limitations in all supported specific netlist formats.

What is claimed is:

1. A method of translating a first element name satisfying a first naming convention in an electronic circuit description, comprising the steps of:

providing a second naming convention which is incompatible with the first naming convention;

providing one or more translation rules derived from compatible elements of the first and second naming conventions; and modifying the first element name according to the translation rules to generate a second element name which satisfies both the first and second naming conventions.

2. The method of claim 1, wherein the electronic circuit description is a netlist.

3. The method of claim 1, wherein the electronic circuit description is a schematic representation.

4. The method of claim 1, wherein the electronic circuit description further includes a first structural format and wherein the method further includes the step of outputting the second element name into a modified electronic circuit description having a second structural format different from the first structural format.

5. The method of claim 1, wherein the first element name is the name of a logic cell type.

6. The method of claim 1, wherein the first element name is the name of a specific instance of a logic cell.

7. The method of claim 1, wherein the first element name is a name of a net which is connected to a logic cell.

8. The method of claim 1, wherein the first element name is a name of an input, output, or bidirectional port.

9. The method of claim 8, wherein a net is connected to a logic cell through the port, and wherein the port and the net are given common names to maintain consistency.

10. The method of claim 1, further including the following steps:

generating a collision list having entries which include names of additional elements in the electronic circuit description;

comparing the second element name to the entries in the collision list; and if the second element name matches one of the entries in the collision list, modifying the second element name to distinguish it from the entries in the list.

11. The method of claim 10, wherein the collision list contains previously translated names of other elements in the electronic circuit description.

12. The method of claim 10, wherein the collision list contains keywords relating to electronic circuit descriptions employing the first and second naming conventions.

13. The method of claim 1, wherein the electronic circuit description is a Verilog netlist.

14. The method of claim 1, wherein the electronic circuit description is an EDIF netlist.

15. The method of claim 1, wherein the electronic circuit description is a VHDL netlist.

16. The method of claim 1, further including the step of performing a structural translation relating to port direction assignments.

17. The method of claim 1, further including the step of generating a database of the modifications made to the first element name.

18. The method of claim 1, further including the step of generating a database of the modifications made to the second element name.

19. The method of claim 1, wherein one of the translation rules includes deleting a character from the first element name.

20. The method of claim 19, wherein the character deleted is an underscore character.

21. The method of claim 19, wherein the character deleted is a space character.

22. The method of claim 1, wherein one of the translation rules includes adding a character to the first element name.

23. The method of claim 22, wherein the character added is an underscore character.

24. The method of claim 22, wherein the character added is an numeric index character.

25. The method of claim 1, wherein one of the translation rules is, if the first element name contains a VHDL keyword, concatenating a designator string to the first element name.

26. The method of claim 25, wherein the designator string is "label_".

27. The method of claim 1, wherein one of the translation rules is, if the first element name contains a Verilog keyword, adding a designator string to the first element name.

28. The method of claim 27, wherein the designator string is "label_".

29. The method of claim 1, wherein one of the translation rules is, if the first element name contains a particular character, adding a designator string to the first element name.

30. The method of claim 29, wherein the designator string is "label_".

31. A method of translating first element names satisfying a first naming convention imposed by a first electronic circuit description format, comprising the steps of:

provide a second naming convention imposed by a second electronic circuit design format that is incompatible with the first naming convention;

providing one or more translation rules derived from compatible elements of the first and second naming conventions;

modifying the first element names according to the translation rules to generate second element names which concurrently satisfy both the first and the second naming conventions; and generating an electronic design description that complies with the second electronic design description format and includes the second element names.

32. The method of claim 31 further comprising the steps of:

generating a database describing modification operations made to the first element names to generate the second element names; and retranslating the second element names to match the first element names in accordance with the modification operations described in the database.

33. A computer-readable medium storing a computer-executable program for translating a first element name satisfying a first naming convention in an electronic circuit description, the program comprising instructions for:

providing a second naming convention which is incompatible with the first naming convention;

providing one or more translation rules derived from compatible elements of the first and second naming conventions; and modifying the first element name according to the translation rules to generate a second element name which concurrently satisfies both the first and second naming conventions.

* * * * *